(12) United States Patent
Zou et al.

(10) Patent No.: US 12,333,849 B2
(45) Date of Patent: Jun. 17, 2025

(54) METHOD FOR ULTRASONIC FINGERPRINT IDENTIFICATION, ULTRASONIC FINGERPRINT APPARATUS, AND ELECTRONIC DEVICE

(71) Applicant: HUIKE (SINGAPORE) HOLDING PTE.LTD., Singapore (SG)

(72) Inventors: Ruijie Zou, Shenzhen (CN); Mingcai Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/810,617

(22) Filed: Aug. 21, 2024

(65) Prior Publication Data
US 2024/0412554 A1 Dec. 12, 2024

Related U.S. Application Data

(63) Continuation of application No. PCT/CN2023/104795, filed on Jun. 30, 2023.

(30) Foreign Application Priority Data

Sep. 16, 2022 (CN) .......................... 202211130195.2

(51) Int. Cl.
*G06V 40/12* (2022.01)
*G06F 3/043* (2006.01)
*G06V 40/13* (2022.01)

(52) U.S. Cl.
CPC ........ *G06V 40/1365* (2022.01); *G06F 3/0433* (2013.01); *G06V 40/1306* (2022.01)

(58) Field of Classification Search
CPC ............ G06V 40/1365; G06V 40/1306; G06F 3/0433
See application file for complete search history.

(56) References Cited

U.S. PATENT DOCUMENTS

| 11,176,391 B1 * | 11/2021 | Pallerla ................. G06V 40/14 |
| 2017/0231534 A1 * | 8/2017 | Agassy ............ G06V 40/1382 382/124 |

(Continued)

FOREIGN PATENT DOCUMENTS

| CN | 106127174 A | 11/2016 |
| CN | 106203301 A | 12/2016 |

(Continued)

OTHER PUBLICATIONS

PCT International Search report of PCT/CN2023/104795 issued on Sep. 15, 2023.

(Continued)

*Primary Examiner* — Jonathan A Boyd
(74) *Attorney, Agent, or Firm* — Emerson, Thomson & Bennett, LLC; Roger D. Emerson; Todd A. Fichtenberg

(57) ABSTRACT

The present disclosure provides a method for ultrasonic fingerprint identification, an ultrasonic fingerprint apparatus, and an electronic device. The method is performed by an ultrasonic fingerprint apparatus arranged below a screen of an electronic device, and the method includes: acquiring a correspondence between a plurality of temperatures and a plurality of parameter groups, wherein each of the parameter groups includes at least one of: a frequency of an ultrasonic signal transmitted to a finger, the number of collections of an ultrasonic fingerprint signal returned from the finger, and a delay of a collection window of the ultrasonic fingerprint signal with respect to a transmission moment of the ultrasonic signal; determining a target parameter group among the plurality of parameter groups based on a first temperature and the correspondence; and performing fingerprint identification at the first temperature based on parameters in the target parameter group.

11 Claims, 4 Drawing Sheets

(56) References Cited

U.S. PATENT DOCUMENTS

| | | | |
|---|---|---|---|
| 2019/0354210 A1* | 11/2019 | Akhbari | G06F 3/0416 |
| 2020/0074134 A1* | 3/2020 | Lim | G06V 40/1365 |
| 2020/0410193 A1 | 12/2020 | Wu | |
| 2021/0326561 A1 | 10/2021 | Qiu | |

FOREIGN PATENT DOCUMENTS

| | | |
|---|---|---|
| CN | 109492472 A | 3/2019 |
| CN | 110287680 A | 9/2019 |
| CN | 110309776 A | 10/2019 |
| CN | 111738227 A | 10/2020 |
| CN | 115311695 A | 11/2022 |
| KR | 20210015042 A | 2/2021 |
| WO | WO2021081230 A1 | 4/2021 |
| WO | WO2021203337 A1 | 10/2021 |

OTHER PUBLICATIONS

Extended Search Report of EP23864448.8 issued by EPO on May 9, 2025.

* cited by examiner

METHOD FOR ULTRASONIC FINGERPRINT IDENTIFICATION, ULTRASONIC FINGERPRINT APPARATUS, AND ELECTRONIC DEVICE

CROSS REFERENCE TO RELATED APPLICATIONS

The present disclosure is a continuation of international application No. PCT/CN2023/104795, filed on Jun. 30, 2023, which claims priority to Chinese patent application No. 202211130195.2 titled "METHOD FOR ULTRASONIC FINGERPRINT IDENTIFICATION, ULTRASONIC FINGERPRINT APPARATUS, AND ELECTRONIC DEVICE" and filed with the China National Intellectual Property Administration on Sep. 16, 2022, both of which are incorporated herein by reference in their entireties.

TECHNICAL FIELD

Embodiments of the present disclosure relate to the field of ultrasonic fingerprints, and more specifically relate to a method for ultrasonic fingerprint identification, an ultrasonic fingerprint apparatus, and an electronic device.

BACKGROUND

Ultrasonic fingerprint identification technology is gradually becoming a mainstream fingerprint unlocking solution because of its advantages such as fast unlocking speed, high accuracy, simple input, and wide application range. In a process of ultrasonic fingerprint identification, an ultrasonic fingerprint apparatus transmits an ultrasonic signal. The ultrasonic signal passes through mediums, such as an adhesive layer and a screen, then reaches a surface the screen, is reflected from a finger on the surface of the screen, then re-passes through the screen and other laminates, and then returns to the ultrasonic fingerprint apparatus. Since a fingerprint valley and a fingerprint ridge of the finger have different reflectivities to the ultrasonic signal, an echo signal collected by the ultrasonic fingerprint apparatus carries fingerprint information. In addition, the ultrasonic fingerprint apparatus further needs to collect a background signal returned when no finger presses the surface of the screen. By subtracting the background signal that does not carry the fingerprint information from the echo signal that carries the fingerprint information, a clear fingerprint image can be obtained.

Since the background signal cannot be collected in real time, and is generally pre-stored, a collection environment between an echo signal collected during current fingerprint identification and the stored background signal may be different. For example, the ambient temperature is different, temperature has impacts on both signal return time and signal intensity, and temperature changes may cause definition changes of the fingerprint image. Therefore, how to reduce the impacts of temperature on ultrasonic fingerprint identification has become a to-be-solved problem.

SUMMARY

Embodiments of the present disclosure provide a method for ultrasonic fingerprint identification, an ultrasonic fingerprint apparatus, and an electronic device, which can reduce the impacts of temperature on ultrasonic fingerprint identification.

In a first aspect, a method for ultrasonic fingerprint identification is provided. The method is performed by an ultrasonic fingerprint apparatus, wherein the ultrasonic fingerprint apparatus is arranged below a screen of an electronic device to implement under-display ultrasonic fingerprint identification, and the method includes: acquiring a correspondence between a plurality of temperatures and a plurality of parameter groups, wherein each of the parameter groups includes at least one of: a frequency of an ultrasonic signal transmitted to a finger above the screen, the number of collections of an ultrasonic fingerprint signal carrying fingerprint information returned from the finger, and a delay of a collection moment of the ultrasonic fingerprint signal with respect to a transmission moment of the ultrasonic signal; determining, when the finger presses the screen, a target parameter group among the plurality of parameter groups based on a current first temperature and the correspondence; and performing fingerprint identification based on parameters in the target parameter group.

In an embodiment of the present disclosure, different parameter groups are configured for different temperatures and a matching parameter group is determined based on an ambient temperature during fingerprint identification, which can effectively reduce the impacts of temperature on ultrasonic fingerprint identification, and improve the performance of fingerprint identification.

In an implementation, the determining the target parameter group among the plurality of parameter groups based on the first temperature and the correspondence includes: determining a second temperature closest to the first temperature among the plurality of temperatures; and determining a parameter group corresponding to the second temperature among the plurality of parameter groups as the target parameter group based on the second temperature and the correspondence, wherein the parameter group corresponding to the second temperature is a parameter group that maximizes a difference value between an ultrasonic fingerprint signal collected at the second temperature and an ultrasonic background signal, and the ultrasonic background signal is a signal that does not carry the fingerprint information and is collected when no finger presses the screen.

In an implementation, the performing fingerprint identification at the first temperature based on the parameters in the target parameter group includes: adjusting the delay in the target parameter group based on a compensation coefficient to obtain a target delay for fingerprint identification at the first temperature; and performing fingerprint identification at the first temperature based on the target delay.

For example, the target delay is equal to a sum of a product of a temperature difference obtained by subtracting the second temperature from the first temperature and the compensation coefficient, and the delay in the target parameter group.

By setting the compensation coefficient, a sampling delay matching the first temperature during current fingerprint identification can be accurately computed, to further improve the definition of the fingerprint image, and reduce the impacts of temperature on ultrasonic fingerprint identification.

In an implementation, the performing fingerprint identification at the first temperature based on the parameters in the target parameter group includes: performing fingerprint identification at the first temperature based on the frequency and/or the number of collections in the target parameter group.

In a second aspect, an ultrasonic fingerprint apparatus is provided. The ultrasonic fingerprint apparatus is arranged below a screen of an electronic device to implement under-display ultrasonic fingerprint identification, and the ultrasonic fingerprint apparatus includes: a processing module configured to: acquire a correspondence between a plurality of temperatures and a plurality of parameter groups, wherein each of the parameter groups includes at least one of: a frequency of an ultrasonic signal transmitted to a finger above the screen, the number of collections of an ultrasonic fingerprint signal carrying fingerprint information returned from the finger, and a delay of a collection moment of the ultrasonic fingerprint signal with respect to a transmission moment of the ultrasonic signal; and determine, when the finger presses the screen, a target parameter group among the plurality of parameter groups based on a current first temperature and the correspondence; and a detection module configured to perform fingerprint identification based on parameters in the target parameter group.

In an implementation, the processing module is specifically configured to: determine a second temperature closest to the first temperature among the plurality of temperatures; and determine a parameter group corresponding to the second temperature among the plurality of parameter groups as the target parameter group based on the second temperature and the correspondence, wherein the target parameter group is a parameter group that maximizes an intensity of a signal collected at the second temperature.

In an implementation, the processing module is further configured to adjust the delay in the target parameter group based on a compensation coefficient to obtain a target delay for fingerprint identification at the first temperature; and the detection module is specifically configured to perform fingerprint identification at the first temperature based on the target delay.

In an implementation, the target delay is equal to a sum of a product of a temperature difference obtained by subtracting the second temperature from the first temperature and the compensation coefficient, and the delay in the target parameter group.

In an implementation, the detection module is specifically configured to: perform fingerprint identification at the first temperature based on the frequency and/or the number of collections in the target parameter group.

In a third aspect, an electronic device is provided, including: a screen; and the ultrasonic fingerprint apparatus according to any one possible implementation in the first aspect or the second aspect, wherein the ultrasonic fingerprint apparatus is arranged below the screen to implement under-display ultrasonic fingerprint identification.

DESCRIPTION OF EMBODIMENTS

Technical solutions of the present disclosure will be described below with reference to the drawings.

An ultrasonic fingerprint apparatus transmits an ultrasonic signal to a finger and receives an echo signal returned from the finger, to acquire a fingerprint image of the finger. Since the ultrasonic signal can penetrate an epidermal layer of skin and is less vulnerable to surface details of a fingerprint, the ultrasonic fingerprint apparatus has a better identification rate in a scenario with, e.g., a stain and a wet hand, and also has stronger anti-counterfeiting properties.

Figure 1:
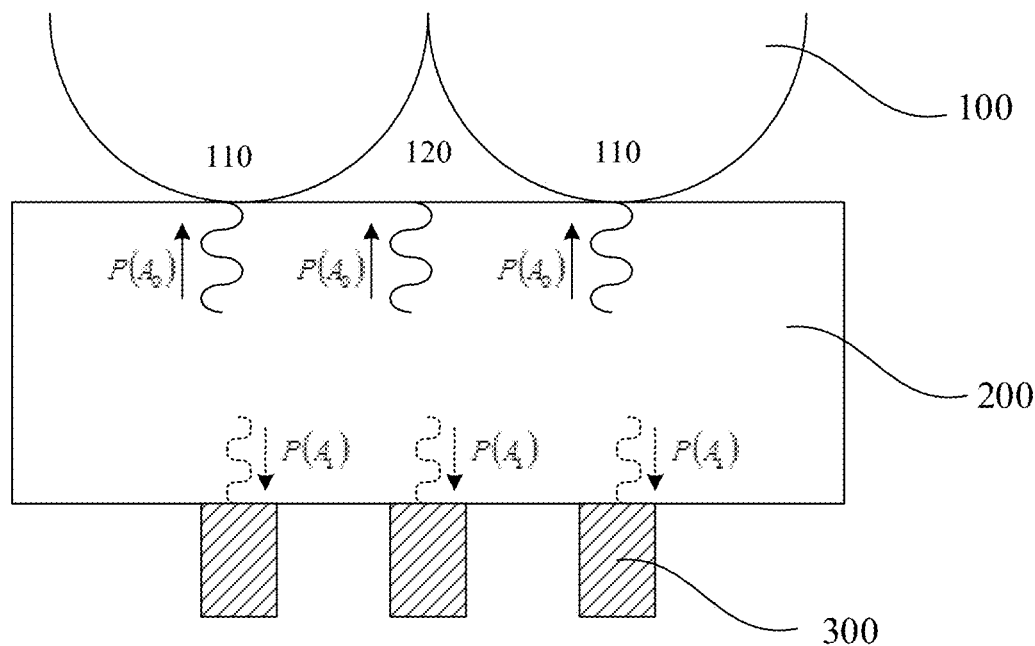
FIG. 1 is a schematic diagram of a principle of ultrasonic fingerprint identification.

FIG. 1 is a schematic diagram of a principle of ultrasonic fingerprint identification. As shown in FIG. 1, an ultrasonic signal $P(A_0)$ transmitted from an ultrasonic fingerprint apparatus 300 passes through a screen 200, and arrives at its upper surface. Since there are differences in acoustic impedance between skin and the screen 200 and between air and the screen 200, the ultrasonic signal $P(A_0)$ will be reflected to form an echo signal $P(A_1)$. A finger 100 includes a fingerprint ridge 110 and a fingerprint valley 120. When the finger 100 presses the screen 200, the fingerprint ridge 110 and the screen 200 contact with each other. However, there is an air gap between the fingerprint valley 120 and the screen 200. Therefore, there is a difference between an intensity of a signal returned from a position of the fingerprint ridge 10 and an intensity of a signal returned from a position of the fingerprint valley 120. This difference can be used to obtain a fingerprint image of the finger 100, thereby achieving ultrasonic fingerprint identification.

In addition, the ultrasonic fingerprint apparatus 300 further needs to collect a signal returned when no finger presses the screen 200. Here, the signal collected by the ultrasonic fingerprint apparatus 300 when no finger presses the screen 200 is referred to as an ultrasonic background signal, and a signal collected by the ultrasonic fingerprint apparatus 300 when the finger 100 presses the screen 200 is referred to as an ultrasonic fingerprint signal. By subtracting the ultrasonic background signal that does not carry fingerprint information from the ultrasonic fingerprint signal that carries the fingerprint information, a clear fingerprint image can be obtained.

Since the ultrasonic background signal cannot be collected in real time, and is generally pre-stored, a collection environment between an ultrasonic fingerprint signal collected during current fingerprint identification and the stored ultrasonic background signal may be different. For example, the ambient temperature is different, temperature has impacts on both signal return time and signal intensity, and temperature changes may cause definition changes of the fingerprint image.

The present disclosure is intended to provide an ultrasonic fingerprint identification solution that configures a plurality of groups of fingerprint identification parameters to adapt to different operating temperatures, thereby optimizing the effects of ultrasonic fingerprint identification.

Figure 2:
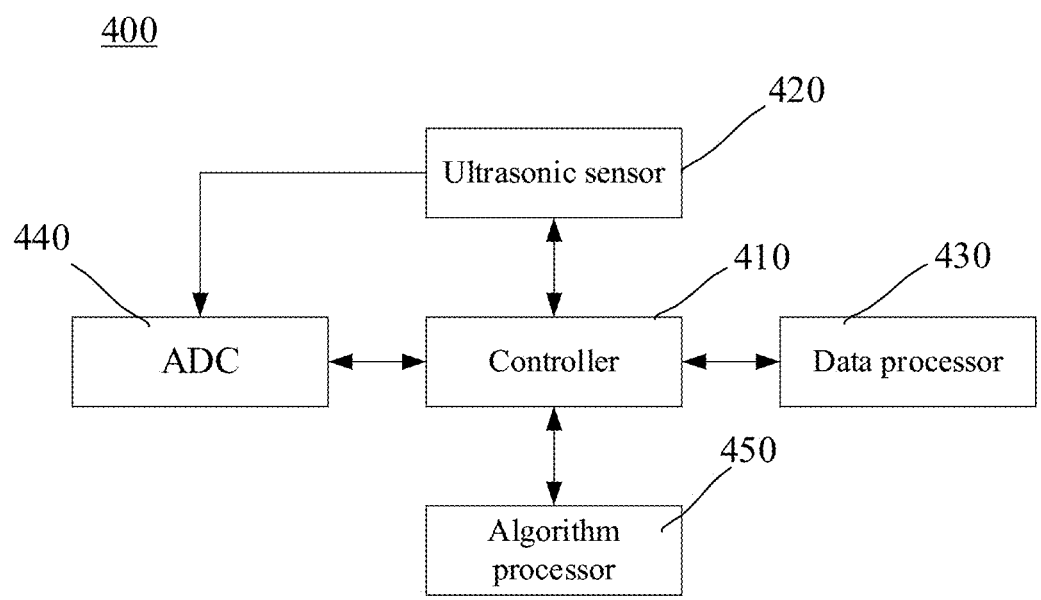
FIG. 2 is an architectural diagram of an ultrasonic fingerprint system adaptable to the present disclosure.

FIG. 2 is an architectural diagram of an ultrasonic fingerprint system 400 adaptable to the present disclosure. The ultrasonic fingerprint system 400 includes a controller 410, an ultrasonic sensor 420, a data processor 430, an analog digital converter (ADC) 440, and an algorithm processor 450. The ultrasonic sensor 420 is, for example, a piezoelectric sensor. The ultrasonic sensor 420, the data processor 430, the ADC 440, and the algorithm processor 450 are all controlled by the controller 410. The controller 410 controls the ultrasonic sensor 420 to transmit and receive ultrasonic signals. A signal received by the ultrasonic sensor 420 is converted into a digital signal by the ADC 440. The data processor 430 performs rearrangement and packaging on the digital signal, and transmits the processed data to the algorithm processor 450, to complete the fingerprint registration and identification.

Figure 3:
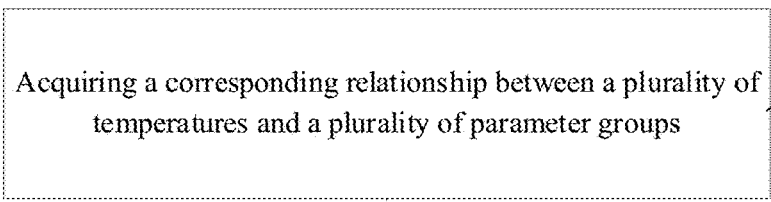
FIG. 3 is a schematic flowchart of a method for ultrasonic fingerprint identification in an embodiment of the present disclosure.
Figure 3:
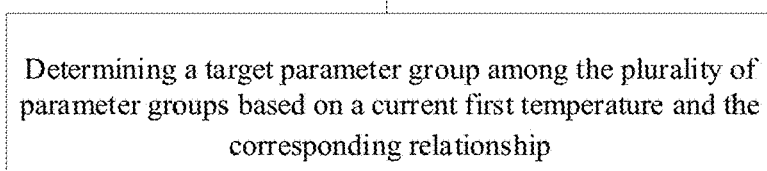
Figure 3:
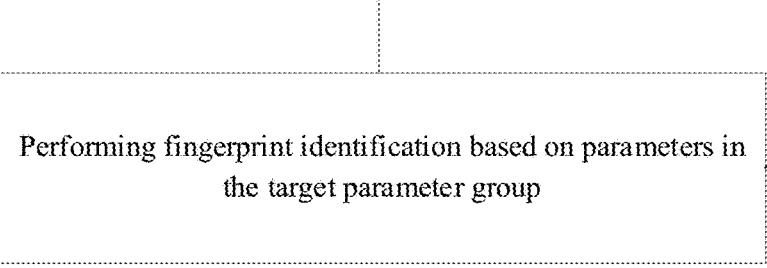

FIG. 3 is a schematic flow chart of a method for ultrasonic fingerprint identification in an embodiment of the present disclosure. As shown in FIG. 3, the method 500 can be performed by an ultrasonic fingerprint apparatus 300. The ultrasonic fingerprint apparatus 300 is arranged below a screen 200 of an electronic device to implement under-display ultrasonic fingerprint identification. As shown in FIG. 3, the method 500 includes some or all of the following steps.

Step 510: acquiring a correspondence between a plurality of temperatures and a plurality of parameter groups.

Each of the parameter groups includes at least one of: a frequency of an ultrasonic signal transmitted to a finger 100 above the screen 200, the number of collections of an ultrasonic fingerprint signal carrying fingerprint information of the figure returned from the finger 100, and a delay of a collection moment of the ultrasonic fingerprint signal with respect to a transmission moment of the ultrasonic signal.

The number of collections is also the number of sampling windows for the ultrasonic fingerprint signal. Since each signal collection is to integrate signals within the sampling windows, the sampling windows may also be referred to as integration windows, and the number of collections may also be referred to as the number of integrations. One collection corresponds to one Tx encoding and Rx receiving process. The signal intensity may be increased by increasing the number of collections to avoid failure in effective fingerprint identification due to a small signal intensity; or the signal intensity may be reduced by reducing the number of collections to prevent occurrence of signal saturation.

This delay is a delay of the sampling windows with respect to the transmission moment of the ultrasonic signal, that is, time elapsed from transmission to reception of the ultrasonic signal, and is also referred to as flytime.

Step 520: determining, when the finger 100 presses the screen 200, a target parameter group among the plurality of parameter groups based on a current first temperature and the correspondence.

Step 530: performing fingerprint identification based on parameters in the target parameter group.

Different parameter groups are configured for different temperatures and based on an ambient temperature during fingerprint identification, a matching parameter group thereof is determined, which can effectively reduce the impacts of temperature on ultrasonic fingerprint identification, and improve the performance of fingerprint identification.

For example, a matching number of collections is configured for one of different temperatures, which can reduce the impacts of temperature changes on the signal intensity. Further, since intensities of signals at different frequencies at different temperatures are different, the frequencies may also be adjusted synchronously for different temperatures to prevent occurrence of signal saturation or too small signals.

For another example, matching sampling delays are configured for different temperatures, which can ensure that the sampling windows are aligned to signal peak positions, thereby obtaining a better signal-to-noise ratio, and reducing the impacts of temperature changes on the signal return time.

If a temperature during current fingerprint identification is the first temperature, a parameter group corresponding to the first temperature among the plurality of temperatures is used as the target parameter group, and fingerprint identification is performed at the first temperature based on the parameters in the target parameter group.

If the plurality of temperatures do not include the first temperature during current fingerprint identification, in step 520, a second temperature closest to the first temperature among the plurality of temperatures may be determined, and a parameter group corresponding to the second temperature among the plurality of parameter groups may be determined as the target parameter group based on the second temperature and the correspondence.

In this correspondence, parameter values in any two parameter groups among the plurality of parameter groups may be partially different or completely different. Parameters in one of the parameter groups corresponding to each temperature are in a parameter group that maximizes a difference value between an ultrasonic fingerprint signal collected at the temperature and an ultrasonic background signal. The ultrasonic background signal is a signal that does not carry the fingerprint information and is collected when the finger 100 does not press the screen 200. For example, the parameter group corresponding to the second temperature is a parameter group that maximizes a difference value between an ultrasonic fingerprint signal collected at the second temperature and the ultrasonic background signal. The difference value between the ultrasonic fingerprint signal and the ultrasonic background signal can be regarded as a mean signal value of fingerprint images, and reflects a difference between a fingerprint ridge 110 and a fingerprint valley 120.

When the above-mentioned correspondence is established, first, the plurality of temperatures are selected, for example, may be selected within an ambient temperature range of $-20°$ C.-$60°$ C. where the ultrasonic fingerprint apparatus may be used, and the temperature change amount is set to STEP=$5°$ C. or $10°$ C. Then, when a temperature T=$-20°$ C., all available frequencies ($F_1, F_2, \ldots, F_m$), the number of all available collections ($N_1, N_2, \ldots, N_n$), and all available sampling delays ($t_1, t_2, \ldots, t_p$) are traversed at the temperature. Here, assuming that there are m frequencies, n collections, and p sampling delays, there are m×n×p possible parameter combinations.

A silica gel test head can be used to simulate a fingerprint shape. The frequency $F_1$ and the number of collections $N_1$ are selected, the delays $t_1$ to $t_p$ are traversed, and p groups of signals returned from the test head are collected; the frequency $F_1$ and the number of collections $N_2$ are selected, the delays ($t_1, t_2, \ldots, t_p$) are traversed, and p groups of signals returned from the test head are collected; ... ; the frequency $F_1$ and the number of collections $N_n$ are selected, the delays ($t_1, t_2, \ldots, t_p$) are traversed, and p groups of signals returned from the test head are collected.

The frequency $F_2$ and the number of collections $N_1$ are selected, the delays ($t_1, t_2, \ldots, t_p$) are traversed, and p groups of signals returned from the test head are collected; the frequency $F_2$ and the number of collections $N_2$ are selected, the delays ($t_1, t_2, \ldots, t_p$) are traversed, and p groups of signals returned from the test head are collected; ... ; the frequency $F_2$ and the number of collections $N_n$ are selected, the delays ($t_1, t_2, \ldots, t_p$) are traversed, and p groups of signals returned from the test head are collected.

In sequence, until traversal from frequency $F_1$ to frequency $F_m$, m×n×p groups of ultrasonic fingerprint signals are obtained.

From the m×n×p groups of ultrasonic fingerprint signals, a group of ultrasonic fingerprint signals with a largest difference from the ultrasonic background signal is selected, and a frequency, the number of collections, and a delay that are used when this group of ultrasonic fingerprint signals is collected are used as a parameter group corresponding to the temperature T=−20° C.

Similarly, when STEP=5° C., parameter groups respectively corresponding to T=−15° C., T=−10° C., . . . , T=60° C. can be obtained, thus establishing the correspondence between the plurality of temperatures and the plurality of parameter groups. The correspondence is saved, and is loaded when the ultrasonic fingerprint apparatus 300 is started.

The correspondence may be expressed in various ways such as a table or a function. For example, a mapping table shown in Table I may be established, in which each temperature corresponds to a parameter group. Each of the parameter groups includes the frequency of the ultrasonic signal, the number of collections of the ultrasonic fingerprint signal, the delay, and a compensation coefficient. Table I is only an example. In an actual application, each parameter group may only include one or two of the parameters thereamong, for example, only include the number of collections and the delay.

TABLE I

| | Parameter group | | | |
|---|---|---|---|---|
| Temperature (° C.) | Frequency (Hz) | Number of collections | Delay (ns) | Compensation coefficient (ns/° C.) |
| $T_1$ | $F_1$ | $N_1$ | $t_1$ | K |
| $T_2$ | $F_1$ | $N_2$ | $t_2$ | K |
| $T_3$ | $F_1$ | $N_3$ | $t_3$ | K |
| . . . | . . . | . . . | . . . | . . . |

The target parameter group for fingerprint identification can be determined based on the temperature during current fingerprint identification and the correspondence shown in Table I. For example, when the current first temperature is $T_1$, fingerprint identification is performed based on the transmission frequency $F_1$, the number of collections $N_1$, and the delay $t_1$. Specifically, the ultrasonic fingerprint apparatus 300 transmits an ultrasonic signal with the frequency of $F_1$ to the finger 200, and collects an ultrasonic fingerprint signal returned from the finger 200 after the delay $t_1$ of the transmission moment with the number of collections being $N_1$; when the first temperature is $T_2$, fingerprint identification is performed based on the frequency $F_1$, the number of collections $N_2$, and the delay $t_2$; and when the first temperature is $T_3$, fingerprint identification is performed based on the frequency $F_1$, the number of collections $N_3$, and the delay $t_3$.

If the current first temperature is not one of the plurality of temperatures included in the correspondence, fingerprint identification can be performed based on the parameter group corresponding to the second temperature closest to the first temperature among the plurality of temperatures, that is, the parameter group corresponding to the second temperature is used as the target parameter group for fingerprint identification.

For example, in step 530, fingerprint identification may be performed based on the frequency in the target parameter group.

For another example, in step 530, fingerprint identification may be performed based on the number of collections in the target parameter group.

For another example, in step 530, fingerprint identification may be performed based on the sampling delay in the target parameter group; or, the sampling delay in the target parameter group may be adjusted based on the compensation coefficient to obtain a target delay for fingerprint identification at the first temperature, and fingerprint identification may be performed based on the target delay.

Figure 4:
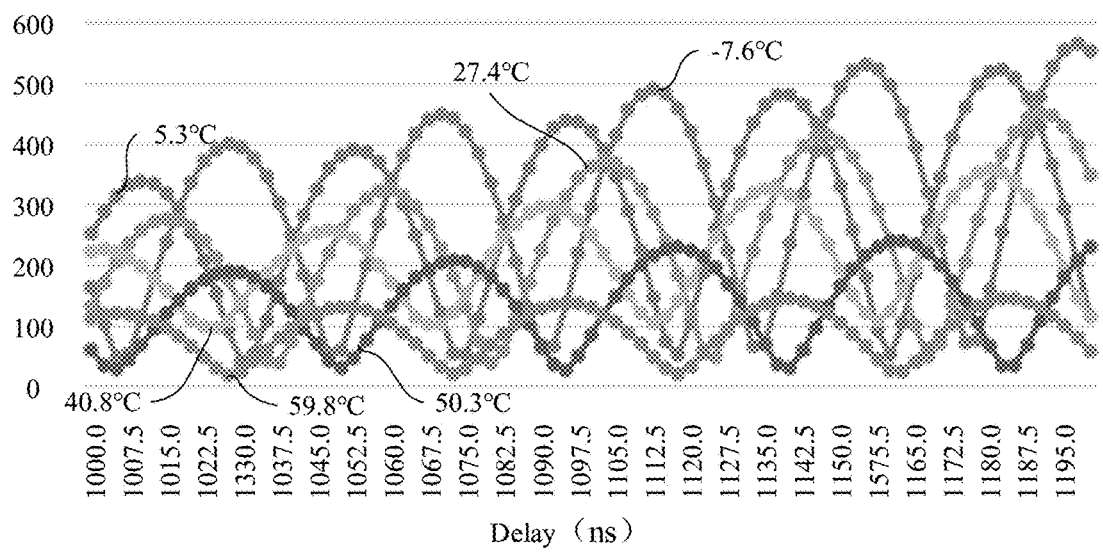
FIG. 4 is a time-varying law of intensities of signals collected at different temperatures.

As can be seen from a time-varying law of intensities of signals collected at different temperatures as shown in FIG. 4, the signals collected based on different delays at different temperatures have different intensities. Based on the variation law of intensities of signals at the temperatures, a delay and a corresponding compensation coefficient corresponding to each of the temperatures can be obtained. When the plurality of temperatures in the correspondence do not include the current first temperature, the compensation coefficient can be used to fit the delay corresponding to the first temperature. The compensation coefficient may be stored in the ultrasonic fingerprint apparatus 300 independently of the correspondence, or may be used as a part of the correspondence, for example, as shown in Table I, wherein the compensation coefficients corresponding to different temperatures may be different, or may be identical. In Table I, for example, the compensation coefficients corresponding to different temperatures are identical.

The second temperature among the plurality of temperatures in the correspondence is a temperature closest to the first temperature, and then the target delay corresponding to the first temperature is determined based on the compensation coefficient and the delay corresponding to the second temperature, to be used for fingerprint identification. Generally, there is a linear relationship between delays and temperatures. Then, a temperature difference between the first temperature and the second temperature is multiplied by the compensation coefficient, and then the product is added to the delay corresponding to the second temperature, to obtain the target delay corresponding to the first temperature, that is, the target delay corresponding to the first temperature=delay corresponding to the second temperature+(first temperature−second temperature)×compensation coefficient.

By setting the compensation coefficient, for any one temperature, a sampling delay matching the temperature can be accurately computed, to further improve the definition of the fingerprint image, and reduce the impacts of temperature on ultrasonic fingerprint identification.

Figure 5:
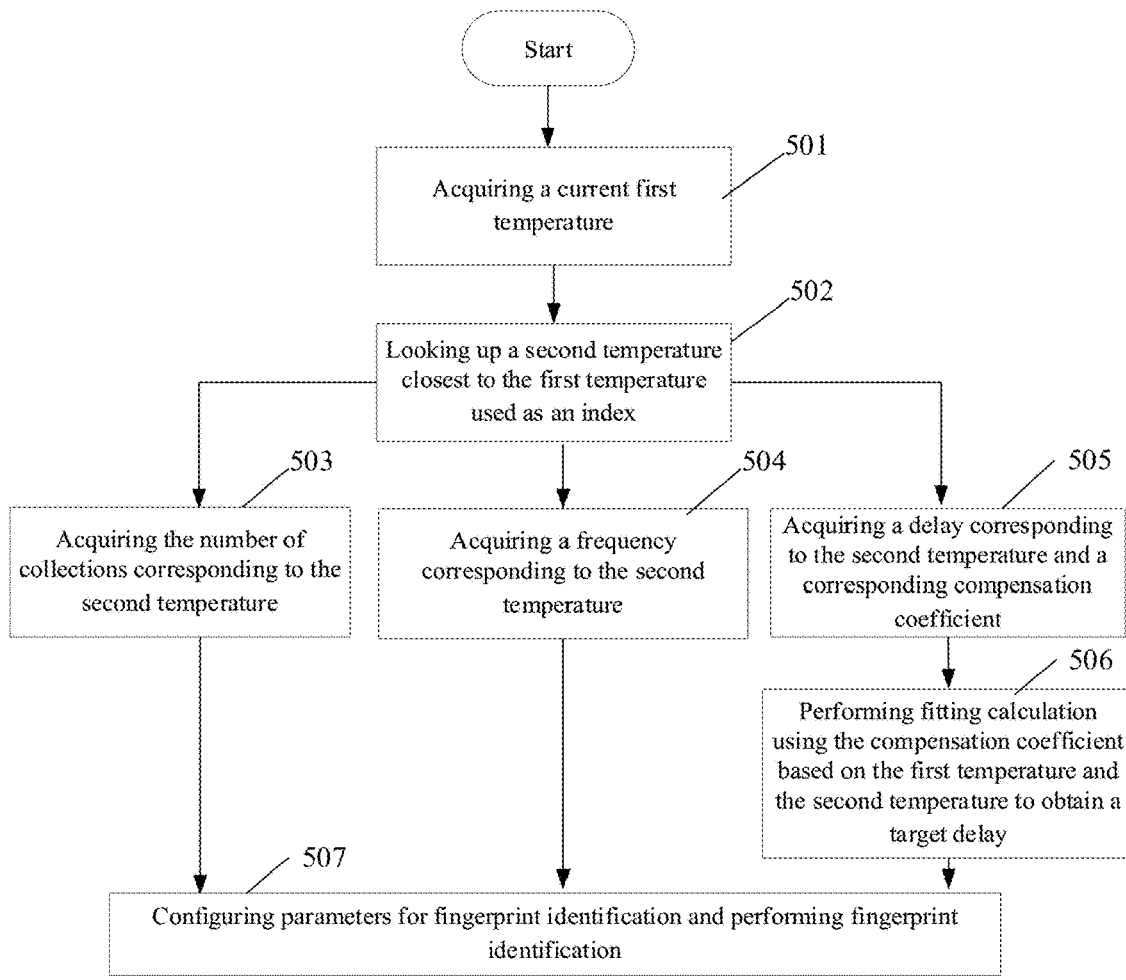
FIG. 5 is a schematic diagram of a possible specific process of the method for ultrasonic fingerprint identification shown in FIG. 3.

FIG. 5 is a possible specific process of the method 500 for ultrasonic fingerprint identification shown in FIG. 3. As shown in FIG. 5, step 501: acquiring a current temperature, that is, a first temperature, through a temperature sensor.

Step 502: looking up a second temperature closest to the first temperature used as an index in a mapping table. The mapping table includes a correspondence between a plurality of temperatures and a plurality of parameter groups.

If the first temperature is one of the plurality of temperatures in the mapping table, the second temperature is the first temperature; and if the first temperature is not one of the plurality of temperatures, the second temperature is a temperature closest to the first temperature. For example, the first temperature and the second temperature are different below.

Step 503: acquiring the number of collections corresponding to the second temperature.

Step 504: acquiring a frequency corresponding to the second temperature.

Step 505: acquiring a delay corresponding to the second temperature and a corresponding compensation coefficient.

Step 506: performing fitting calculation using the compensation coefficient based on the first temperature and the second temperature to obtain a target delay.

Step 507: performing parameter configuration and performing fingerprint identification based on the number of collections obtained in step 503, the frequency obtained in step 504, and the target delay obtained in step 506.

Figure 6:
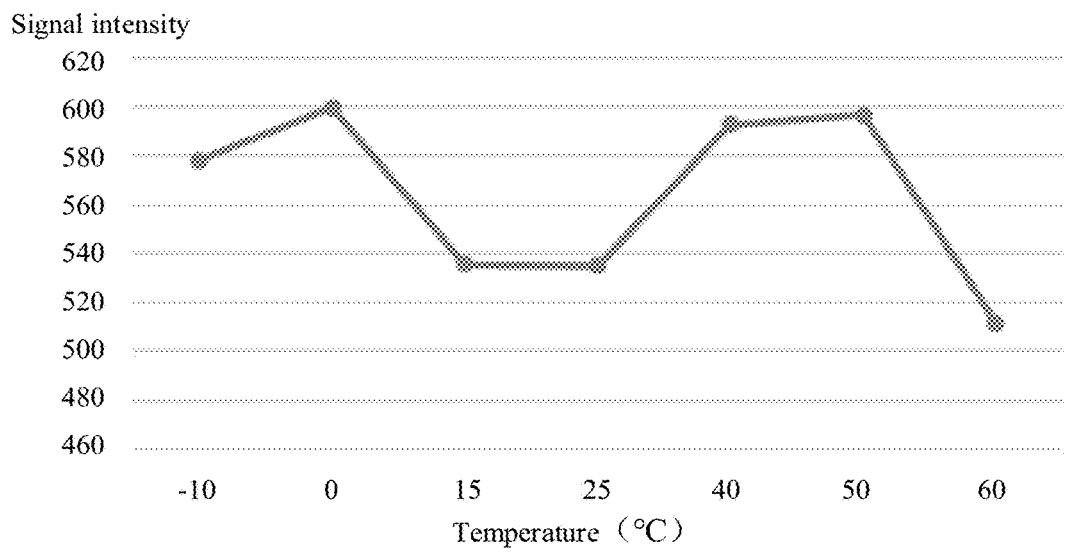
FIG. 6 is a schematic diagram of a temperature-varying law of mean signal values of fingerprint images in an embodiment of the present disclosure.

After the fingerprint identification solution of the present disclosure is used, an actually tested variation law of mean signal values of fingerprint images at different temperatures is as shown in FIG. 6. As can be seen from FIG. 6, the ultrasonic fingerprint identification solution based on the present disclosure can quickly obtain optimal parameter configuration based on a temperature during current fingerprint identification, so that the mean signal values of the fingerprint images collected at different temperatures are all maintained in a high intensity range, thereby providing a good foundation for subsequent fingerprint image processing and identification, and effectively improving the performance of ultrasonic fingerprint identification.

Figure 7:
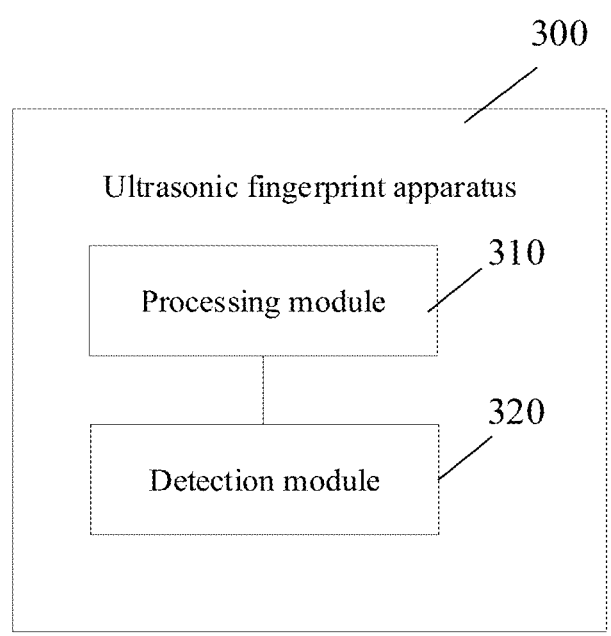
FIG. 7 is a schematic block diagram of an ultrasonic fingerprint apparatus in an embodiment of the present disclosure.

The present disclosure further provides an ultrasonic fingerprint apparatus 300. As shown in FIG. 7, the ultrasonic fingerprint apparatus 300 is arranged below a screen 200 of an electronic device to implement under-display ultrasonic fingerprint identification. The ultrasonic fingerprint apparatus 300 includes a processing module 310 and a detection module 320. The detection module 320 may include, for example, an ultrasonic sensor 420 shown in FIG. 2, and the processing module 310 may include, for example, a controller 410, an ADC 440, a data processor 430, etc. shown in FIG. 2. The processing module 310 may further include an algorithm processor 450 shown in FIG. 2, or the algorithm processor 450 may be a processor, such as a CPU, of the electronic device.

The processing module 310 is configured to: acquire a correspondence between a plurality of temperatures and a plurality of parameter groups, wherein each of the parameter groups includes at least one of: a frequency of an ultrasonic signal transmitted to a finger 100 above the screen 200, the number of collections of an ultrasonic fingerprint signal carrying fingerprint information returned from the finger 100, and a delay of a collection moment of the ultrasonic fingerprint signal with respect to a transmission moment of the ultrasonic signal; and determine, when the finger 100 presses the screen 200, a target parameter group among the plurality of parameter groups based on a current first temperature and the correspondence.

The detection module 320 is configured to perform fingerprint identification based on parameters in the target parameter group.

In an implementation, the processing module 310 is specifically configured to: determine a second temperature closest to the first temperature among the plurality of temperatures; and determine a parameter group corresponding to the second temperature among the plurality of parameter groups as the target parameter group based on the second temperature and the correspondence, wherein the target parameter group is a parameter group that maximizes an intensity of a signal collected at the second temperature.

In an implementation, the processing module 310 is further configured to adjust the delay in the target parameter group based on a compensation coefficient to obtain a target delay for fingerprint identification at the first temperature; and the detection module 320 is specifically configured to perform fingerprint identification at the first temperature based on the target delay.

For example, the target delay is equal to a sum of a product of a temperature difference between the first temperature and the second temperature and the compensation coefficient, and the delay in the target parameter group.

In an implementation, the detection module 320 is specifically configured to: perform fingerprint identification at the first temperature based on the frequency and/or the number of collections in the target parameter group.

It should be understood that the above description of the method 500 for ultrasonic fingerprint identification may be referred to for specific details of the ultrasonic fingerprint apparatus 300, which will not be repeated here for the sake of brevity.

The present disclosure further provides an electronic device 600. The electronic device 600 includes a screen 200; and the above-mentioned ultrasonic fingerprint apparatus 300. The ultrasonic fingerprint apparatus 300 is arranged below the screen 200 to implement under-display ultrasonic fingerprint identification.

As an example and non-restrictively, the electronic device in an embodiment of the present disclosure may be a portable or mobile computing device, such as a terminal device, a mobile phone, a tablet computer, a notebook computer, a desktop computer, a game device, a vehicle electronic device, or a wearable smart device, or may be other electronic devices, such as an electronic database, an automobile, or an automated teller machine (ATM) of a bank. The wearable smart device includes a device that has complete functions and a large size, and can realize complete or partial functions without relying on a smart phone, such as a smart watch or smart glasses, and includes a device that only focuses on a certain type of application functions and needs to be used in cooperation with other devices such as a smart phone, for example, various smart bracelets and smart jewelries for monitoring physical signs.

It should be noted that the embodiments in the present disclosure and/or the technical features in the embodiments may be combined with each other in any way in case of no conflict, and the combined technical solutions should also fall into the scope of protection of the present disclosure.

The system, apparatus, and method disclosed in the embodiments of the present disclosure may be implemented by other approaches. For example, some features of the method embodiments described above may be neglected, or may not be performed. The above described apparatus embodiments are merely illustrative, the division of the units is only a logical function division, other division manners may be available during actual implementations, and a plurality of units or components may be combined or may be integrated into another system. In addition, the coupling between the units or the coupling between the components may be direct coupling or indirect coupling, and the above-mentioned coupling includes electrical, mechanical, or other forms of connection.

Those skilled in the art can clearly understand that, for convenience and simplicity of description, corresponding processes and technical effects in the above method embodiments may be referred to for specific working process of the above described apparatus and device and technical effects thereof, which will not be repeated here.

It should be understood that the specific examples in the embodiments of the present disclosure are provided only to help those skilled in the art to better understand the embodiments of the present disclosure, rather than limiting the scope of the embodiments of the present disclosure. Those skilled in the art may make various improvements and modifications on the basis of the above embodiments, and these improvements or modifications all fall within the scope of protection of the present disclosure.

While the above description merely provides specific embodiments of the present disclosure, the scope of protection of the present disclosure is not limited to the specific embodiments. Any person skilled in the art can easily conceive of alterations or replacements within the technical scope disclosed in the present disclosure. All these alterations or replacements should be encompassed within the scope of protection of the present disclosure. Therefore, the scope of protection of the present disclosure should be determined by the scope of protection of the appended claims.

What is claimed is:

1. A method for ultrasonic fingerprint identification, performed by an ultrasonic fingerprint apparatus, wherein the ultrasonic fingerprint apparatus is arranged below a screen of an electronic device to implement under-display ultrasonic fingerprint identification, and the method comprises:
acquiring a correspondence between a plurality of temperatures and a plurality of parameter groups, wherein each of the parameter groups comprises at least one of: a frequency of an ultrasonic signal transmitted to a finger above the screen, a number of collections of an ultrasonic fingerprint signal carrying fingerprint information returned from the finger, and a delay of a collection moment of the ultrasonic fingerprint signal with respect to a transmission moment of the ultrasonic signal;
determining, when the finger presses the screen, a target parameter group among the plurality of parameter groups based on a current first temperature and the correspondence; and
performing fingerprint identification based on parameters in the target parameter group.

2. The method according to claim 1, wherein the determining the target parameter group among the plurality of parameter groups based on the first temperature and the correspondence comprises:
determining a second temperature closest to the first temperature among the plurality of temperatures; and
determining a parameter group corresponding to the second temperature among the plurality of parameter groups as the target parameter group based on the second temperature and the correspondence, wherein the parameter group corresponding to the second temperature is a parameter group that maximizes a difference value between an ultrasonic fingerprint signal collected at the second temperature and an ultrasonic background signal, and the ultrasonic background signal is a signal that does not carry the fingerprint information and is collected when no finger presses the screen.

3. The method according to claim 1, wherein the performing fingerprint identification at the first temperature based on the parameters in the target parameter group comprises:
adjusting the delay in the target parameter group based on a compensation coefficient to obtain a target delay for fingerprint identification at the first temperature; and
performing, based on the target delay, fingerprint identification at the first temperature.

4. The method according to claim 3, wherein the target delay is equal to a sum of a product of a temperature difference obtained by subtracting the second temperature from the first temperature and the compensation coefficient, and the delay in the target parameter group.

5. The method according to claim 1, wherein the performing fingerprint identification at the first temperature based on the parameters in the target parameter group comprises:
performing, based on the frequency and/or the number of collections in the target parameter group, fingerprint identification at the first temperature.

6. An ultrasonic fingerprint apparatus, being arranged below a screen of an electronic device to implement under-display ultrasonic fingerprint identification, the ultrasonic fingerprint apparatus comprising:
a processing module configured to:
acquire a correspondence between a plurality of temperatures and a plurality of parameter groups, wherein each of the parameter groups comprises at least one of: a frequency of an ultrasonic signal transmitted to a finger above the screen, a number of collections of an ultrasonic fingerprint signal carrying fingerprint information returned from the finger, and a delay of a collection moment of the ultrasonic fingerprint signal with respect to a transmission moment of the ultrasonic signal; and
determine, when the finger presses the screen, a target parameter group among the plurality of parameter groups based on a current first temperature and the correspondence; and
a detection module configured to perform fingerprint identification based on parameters in the target parameter group.

7. The ultrasonic fingerprint apparatus according to claim 6, wherein the processing module is specifically configured to:
determine a second temperature closest to the first temperature among the plurality of temperatures; and
determine a parameter group corresponding to the second temperature among the plurality of parameter groups as the target parameter group based on the second temperature and the correspondence, wherein the parameter group corresponding to the second temperature is a parameter group that maximizes a difference value between an ultrasonic fingerprint signal collected at the second temperature and an ultrasonic background signal, and the ultrasonic background signal is a signal that does not carry the fingerprint information and is collected when no finger presses the screen.

8. The ultrasonic fingerprint apparatus according to claim 6, wherein:
the processing module is further configured to adjust the delay in the target parameter group based on a compensation coefficient to obtain a target delay for fingerprint identification at the first temperature; and
the detection module is specifically configured to perform fingerprint identification at the first temperature based on the target delay.

9. The ultrasonic fingerprint apparatus according to claim 8, wherein the target delay is equal to a sum of a product of a temperature difference obtained by subtracting the second temperature from the first temperature and the compensation coefficient, and the delay in the target parameter group.

10. The ultrasonic fingerprint apparatus according to claim 6, wherein the detection module is specifically configured to:

perform fingerprint identification at the first temperature based on the frequency and/or the number of collections in the target parameter group.

11. An electronic device, comprising:
a screen; and
an ultrasonic fingerprint apparatus, arranged below the screen to implement under-display ultrasonic fingerprint identification and comprising:
   a processing module configured to:
      acquire a correspondence between a plurality of temperatures and a plurality of parameter groups, wherein each of the parameter groups comprises at least one of: a frequency of an ultrasonic signal transmitted to a finger above the screen, a number of collections of an ultrasonic fingerprint signal carrying fingerprint information returned from the finger, and a delay of a collection moment of the ultrasonic fingerprint signal with respect to a transmission moment of the ultrasonic signal; and
      determine, when the finger presses the screen, a target parameter group among the plurality of parameter groups based on a current first temperature and the correspondence; and
   a detection module configured to perform fingerprint identification based on parameters in the target parameter group.

* * * * *